United States Patent
Arai et al.

[15] 3,666,661
[45] May 30, 1972

[54] SOFTENING AGENT COMPOSITION FOR TEXTILES

[72] Inventors: Sumio Arai; Masaru Inouye; Yuzuro Ogata; Yukihisa Niimi; Uitiro Nishimoto, all of Wakayama, Japan

[73] Assignee: Kao Soap Co., Ltd., Tokyo, Japan

[22] Filed: Apr. 6, 1970

[21] Appl. No.: 26,096

[30] Foreign Application Priority Data

Apr. 9, 1969  Japan..................................44/27362

[52] U.S. Cl..................252/8.9, 252/8.6, 117/139.5 CQ, 117/138.8 F, 8/115.6
[51] Int. Cl. .................................................D06m 13/18
[58] Field of Search............8/115.6; 117/139.5 CQ, 138.8 F; 252/8.6, 8.9

[56] References Cited

UNITED STATES PATENTS

| | | | |
|---|---|---|---|
| 3,168,416 | 2/1965 | Zech | 117/139.5 |
| 3,431,142 | 3/1969 | Schwarz | 117/139.5 |
| 2,933,366 | 4/1960 | Col | 8/128 |

*Primary Examiner*—George F. Lesmes
*Assistant Examiner*—John C. Cooper, III
*Attorney*—Woodhams, Blanchard and Flynn

[57] ABSTRACT

A softening agent composition for textiles containing an epichlorohydrin adduct of sorbitan higher fatty acid mono- or diester, which is a novel softening agent compound, and an ethoxylated product of mono-, di- or triglyceride of 12-oxy steric acid, which composition can be advantageously used as the softener in a conventional resin finishing process.

3 Claims, No Drawings

SOFTENING AGENT COMPOSITION FOR TEXTILES

BACKGROUND OF THE INVENTION

1. Field of the Invention

This invention relates to a novel reactive-type softening agent compound for textiles. More particularly, it relates to a softening agent composition, containing the novel reactive-type softening agent compound, which is excellent in washing resistance and can be suitably used with conventional resin-finishes on cellulose textiles, synthetic textiles and blended textiles thereof.

2. Description of the Prior Art

Recently, there has been a tendency to use cationic compounds more frequently for the softening treatment of hydrophilic textiles, but, in some applications of the finished textiles, the reduction of wettability caused by the treatment will be a disadvantage. On the other hand, the softening treatment with anionic or nonionic softening agents often results in low durability and insufficient washing resistance. Further, the properties of fibers in cellulose textiles, synthetic textiles and blended textiles have been improved by a resin-finishing process in terms of crease resistance, shrink resistance, permanent press or soil release. But, even though the main purposes of the resin-finishing treatment can be attained, some defects are still present, For example, there will be recognized a deterioration of the physical strength, a loss of the rewettability and an undesirable change in the feel of the treated fabrics.

For example, the permanent-press finishing process will make the fabrics hydrophobic and it results in an increase of the soiling of the fabrics. If a soil-release finishing treatment is performed for the purpose of minimizing the above defect, the finishing agent used in the treatment will usually form a high-molecular-weight film to coat the fabrics and the softness or feel as well as the tear strength of the treated fabrics will be lowered.

SUMMARY OF THE INVENTION

We have discovered an excellent softening agent composition for producing a durable softness in hydrophilic textiles, which can be used simultaneously in the resin-finishes of such hydrophilic textiles to give adequate hygroscopicity, antistatic property and flexibility to the treated fabrics, increase the tear strength and improve the feel of the treated fabrics.

One of the main components of the softening agent composition according to the present invention is an epichlorohydrin adduct of sorbitol or sorbitan higher fatty acid mono- or diester or mixture thereof, which is a novel compound that has not been known before. In order to synthesize this novel compound, there may be used as the higher fatty acid a saturated or unsaturated monohydric fatty acid of $C_8$ to $C_{22}$ which is linear or branched at the γ-position of the chain.

Exemplary of $C_8$ to $C_{22}$ chain saturated or unsaturated fatty acids to be used are caprylic acid, capric acid, lauric acid, myristic acid, palmitic acid, stearic acid, margaric acid, oleic acid, laurolenic acid, myristolenic acid, palmitolenic acid, linoleic acid, linolenic acid. Commercial fatty acids which are mixtures of saturated and/or unsaturated fatty acids may be used. Oxo-synthetic branched acids which can be obtained from $C_7$ to $C_{21}$ olefins can be also used.

The mol number of the added epichlorohydrin unit to the sorbitol or sorbitan higher fatty acid mono- or di-ester is preferably 0.3 – 3.0 mols per one free hydroxyl group of the ester.

The synthesizing process of said adduct compound will be explained below by the following examples A and B, but this main component of the present invention is not limited by these examples.

EXAMPLE A 11.2 grams of concentrated sulfuric acid were added to 631.2 grams (0.9 mol) of an equimolar mixture of sorbitan monooleate and sorbitan dioleate (having a hydroxy value of 200 and an acid value of 1.7) and the resultant mixture was heated at 80° C. in a nitrogen stream. 208.3 grams of epichlorohydrin (a re-distilled product having a boiling point of 114°–116° C.) were quickly added dropwise to said mixture and the reaction was continued for 20 hours by keeping the temperature at 130° C. The reaction product was treated with the topping at 80°–85° C. for about 45 minutes under a reduced pressure (5 – 15 mmHg) and the unreacted epichlorohydrin was distilled off. The residue was neutralized with an alkaline solution consisting of 6.6 grams of sodium hydroxide and 7.5 grams of water at room temperature and the neutralized product was heated at 80° - 85° C. under a reduced pressure (5 – 15 mm Hg) to remove water. The remaining product was 560 grams. It was dissolved in 500 grams of benzene and the precipitated Glauber's salt was filtered off. The filtrate was distilled to remove benzene and there were obtained 529.9 grams of the desired adduct product having an oxirane oxygen content of 0.0 percent and a chlorine content of 5.9 percent. The mol number of the added epichlorohydrin in the product was 1.55 per 1 molecule of the starting ester and 0.62 per one free hydroxyl group of the starting ester.

In the above-mentioned reaction, a similar product was obtained by replacing the sulfuric acid catalyst with 0.01 to 0.1 mol of tin tetrachloride or boron trifluoride (as an etherate complex) per 1 mol of epichlorohydrin in the reaction mixture.

EXAMPLE B 1.5 gram of concentrated sulfuric acid was added to 97.0 grams of sorbitan monooleate (having a hydroxy value of 347 and an acid value of 1.3) with agitation and the mixture was heated at 80° C. The mixture was continuously agitated in a nitrogen gas stream and 27.8 grams (0.3 mol) of epichlorohydrin were added dropwise. After the addition, the mixture was allowed to react at 130° C. for 20 hours. After completing the reaction, the unreacted epichlorohydrin was distilled off at 80° C. under a pressure of 20 – 30 mm Hg and the residue was neutralized by adding 2.4 grams of an aqueous 50 percent by weight solution of sodium hydroxide at a room temperature with vigorous agitation. The resultant product was again heated at 80°–85° C. under a reduced pressure to remove water. After cooling, the by-produced Glauber's salt was allowed to precipitate completely and 150 grams of benzene were added to dissolve the adduct. Then the Glauber's salt was filtered off and, from the filtrate, benzene was removed by using a rotary evaporator to obtain 115 grams of a brown fluid product. It had an oxirane oxygen content of 0.0 percent, a total chlorine content of 6.00 percent, and a sodium content of 0.15 percent. 1 mol of epichlorohydrin was added per 1 mol of the starting ester.

In the above-described reaction, 46.0 grams (0.5 mol) of epichlorohydrin were similarly reacted in the presence of 2.5 grams of concentrated sulfuric acid and the adduct of 2.2 mol of epichlorohydrin per 1 mol of the starting ester was obtained.

The softening agent composition of the present invention can be composed of the above-described main component alone. However, more effectively, it should be comprised of the above-described main component and an ethoxylated product of mono-, di- or trigly-ceride of 12-oxy-stearic acid.

The ethylene oxide to be added to the carbon chain of the fatty acid group in mono-, di- or triglyceride of 12-oxy-stearic acid in order to prepare an ethylene oxide adduct thereof is preferably 10 – 50 mols per 1 molecule of glyceride.

The composition of the present invention may be properly selected from the following range of the respective components, depending on the purpose of the treatment.

| | |
|---|---|
| Epichlorohydrin adduct of sorbitan fatty acid ester | 20–80% by weight |
| Ethylene oxide adduct of glyceride of 12-oxy-stearic acid (or polyoxyethylene | |

12-oxy-stearic triglyceride) 80–20% by weight

For the softening treatment of cotton or cotton-blended textiles, an aqueous solution of a mixture consisting of an epichlorohydrin adduct of sorbitan fatty acid ester and an ethylene oxide adduct of a glyceride of 12-oxy stearic acid as described above can be used and a very good feel of the treated fabric can be obtained. The total concentration of the effective components in the treating bath can be properly varied depending on the process conditions, but it is usually selected to be in the range of 1 to 5 percent by weight. The amount of the epichlorohydrin adduct in the above mixture can be varied depending on the mol number of the added epichlorohydrin, but usually it should be preferably selected in the range of 40 – 70 percent by weight based on the mixture composition.

As described above, the composition of the present invention can be advantageously used in the conventional resin-finishes on textiles. In case the softening agent composition according to the present invention is used in a resin-finish, it is dissolved in the resin-finishing bath and there can be added simultaneously some suitable auxiliary agents in the bath depending on the purpose of the finishing process. As such auxiliary agents, water-soluble salts derived from a copolymer of maleic anhydride and a copolymerizable monomer, for instance, alkali metal salts and water-soluble salts prepared by partially neutralizing with ammonia or a lower alkylamine to prepare a half amide of a copolymer and neutralizing the remaining free carboxyl group of said half-amide. The above-described copolymerizable monomer may be selected from the group consisting of vinyl acetate, diisobutylene, vinyl methyl ether, ethylene, acrylic acid, vinyl pyrrolidone, etc. Such water-soluble polymer may be substituted by other water-soluble polymer such as sodium polyacrylate, CMC, PVA and sodium polymaleate. These water-soluble polymers should have preferably a good miscibility with the softening agent in a resin-finishing bath and have a molecular weight lower than 10,000. If necessary, an anionic surface active agent such as alkali salts of dialkylsulfosuccinic acid, alkylaryl sulfonic acid, N-alkaloyl-N-alkyltauric acid, mono- or di-alkyl-phosphoric ester can be incorporated in the bath to give a rewettability to the treated textiles, without any reverse effect on the properties of the softening agent composition according to the present invention.

DESCRIPTION OF THE PREFERRED EMBODIMENTS

The present invention shall now be explained with reference to the following examples.

EXAMPLE 1

The following samples A and B as shown below of the softening agent composition according to the present invention were prepared and fabrics of No. 40 cotton broad cloth and of polyester/cotton blended serge were treated by them for softening the fabrics.

| | Composition A | Composition B |
|---|---|---|
| 1.) Epichlorohydrin adduct (1.0) of sorbitan monooleate | 16% | – |
| 2. Epichlorohydrin adduct (1.55) of sorbitan sesquioleate | – | 16% |
| 3. Polyoxyethylene (25) 12-oxy-stearic triglyceride | 12% | 12% |
| 4. Water | 72% | 72% |
| | (% by weight) | |

In the above, the numerals in the parentheses are mol numbers of the added epichlorohydrin or ethylene oxide.

From the above composition A and B, an aqueous solution containing 3 percent of the effective component was prepared respectively, into which a test cloth was immersed at 40° C. for 5 minutes according to the bath ratio of 1 : 100 and dried at a temperature lower than 100° C. The softness of the treated test cloth was determined by a Clark softness tester, by which the longitudinal length (in mm.) of the cloth was measured at 20° C. with 65 percent RH, when the angle of the cloth falling down became 90°. The durability of the effect was determined by measuring the softness as described above, after washing the cloth three times with a 0.2 percent synthetic detergent bath under usual domestic washing conditions and drying the water-washed cloth. The results are shown below.

| | Test cloth | | | |
|---|---|---|---|---|
| | No. 40 cotton broad cloth | | Polyester/cotton serge | |
| Softening agent | Before washing | After washing | Before washing | After washing |
| Untreated cloth | 90 | 68 | 64 | 67 |
| Composition A of the present invention | 69 | 62 | 62 | 64 |
| Composition B of the present invention | 68 | 62 | 61 | 63 |
| Commercial nonionic softening agent I | 70 | 65 | 62 | 67 |
| Commercial nonionic softening agent II | 75 | 66 | 63 | 67 |
| Commercial anionic softening agent I | 69 | 64 | 63 | 65 |
| Commercial anionic softening agent II | 78 | 68 | 64 | 66 |

NOTE.—The commercial products used in the above test are comprised of the following components: Commercial nonionic softening agent I, Sorbitan sesquioleate plus polyoxyethylene castor oil; Commercial nonionic softening agent II, Polyhydric alcohol fatty acid ester; Commercial anionic softening agent I, Sperm alcohol sulfate (main component) plus other nonionic surface active agents; Commercial anionic softening agent II, Sperm alcohol sulfate.

The cloth sample of polyvinylalcohol/cotton blended fabrics treated in the same manner as described above was heated at 225° C. and the cloth samples of cotton and polyester/cotton blended fabrics were heated at 235° C., respectively for 3 minutes in a thermotester and the reflectivity of the heated cloth was determined at 440 mμ by a color machine as a measure of the yellowing of the cloth. The higher value of the reflectivity means a better heat resistance. The results are shown in the following table.

| | Polyvinyl-alcohol/cotton | Cotton | Polyester/cotton |
|---|---|---|---|
| Untreated cloth | 68.0% | 66.4% | 71.8% |
| Composition A of the present invention | 68.0 | 74.5 | 72.6 |
| Composition B of the present invention | 66.5 | 74.3 | 71.7 |
| Commercial anionic softening agent II | 36.4 | 65.4 | 70.5 |

EXAMPLE 2

A sample of polyester/rayon blended serge was treated with a wash-and-wear resin finishing. The following softening agent compositions C and D according to the present invention were added to the resin bath.

| | Composition C | Composition D |
|---|---|---|
| Epichlorohydrin (1.0) adduct of sorbitan monooleate | 11 | |
| Epichlorohydrin (1.55) adduct of sorbitan sesquioleate | | 11 |
| Polyoxyethylene (25) 12-oxy-stearic triglyceride | 9 | 9 |
| Sodium salt of diisobutylene-maleic acid copolymer (molecular weight of about 1,000) | 5 | 5 |
| Water | 75 | 75 |
| | (The numerals are % by weight) | |

COMPOSITION OF THE RESIN BATH

| Components | Sample number | | | |
|---|---|---|---|---|
| | 0 | 1 | 2 | 3 |
| Sumitex Cream 450 [1] | 20 | 20 | 20 | 20 |
| Sumitex Resin M-3 [2] | 6 | 6 | 6 | 6 |
| Sumitex Accelerator ACX [3] | 2.5 | 2.5 | 2.5 | 2.5 |
| Composition C of the present invention | | 2 | | |
| Composition D of the present invention | | | 2 | |
| Commercial nonionic softening agent [4] | | | | 2 |

[1] Urea-formaldehyde precondensate product of 50% solids for resin finishing (manufactured by Sumitomo Chemical Co., Osaka, Japan).
[2] Trimethylol melamine product of 80% solids for resin finishing (manufactured by Sumitomo Chemical Co., Osaka, Japan).
[3] Organic amine salt catalyst solution of 35% solids for resin finishing (manufactured by Sumitomo Chemical Co., Osaka, Japan).
[4] Anionic surface active agent mixture consisting mainly of polyhydric alcohol fatty acid ester.

NOTE.—In this table, the numerals are parts by weight.

The sample cloth was immersed twice in the resin bath, squeezed twice (80 percent), preheated at 105° C. for 2 minutes, and then cured at 150° C. for 4 minutes. The treated cloth was soaped with a solution of 0.2 percent nonionic detergent and 0.4 percent soda ash at 40° C. The softness of the test cloth was similarly determined as in Example 1. The results are as follows:

| Sample No. | 0 | 1 | 2 | 3 |
|---|---|---|---|---|
| Before washing | 85 | 71 | 72 | 75 |
| After washing | 80 | 68 | 68 | 70 |

EXAMPLE 3

Embodiments of the permanent-press finishing by using the softening agent composition of the present invention are shown in this example.

(a) PRE-CURING METHOD

[Composition of the resin bath (parts by weight)]

| Components | Sample Number | | | |
|---|---|---|---|---|
| | 10 | 11 | 12 | 13 |
| Sumitex Resin NS-2 [1] | 15 | 15 | 15 | 15 |
| Sumitex accelerator MX [2] | 4.5 | 4.5 | 4.5 | 4.5 |
| Composition C [3] | | 2 | | |
| Composition D [3] | | | 2 | |
| Commercial silicone softening agent | | | | 2 |

[1] Glyoxal-type resin of 50% solids for textile finishing (Sumitomo Chemical Co.).
[2] Magnesium chloride catalyst solution of 30% solids (Sumitomo Chemical Co.).
[3] The compositions C and D are the same as used in Example 2.

NOTE.—Treating conditions: Test cloth—Polyester/cotton blended No. 40 broad cloth; Operation—Immersing twice in the resin bath and squeezing twice (75%), preheating at 80° C. for 3 minutes, and curing at 150° C for 3 minutes, soaping at 40° C. for 1 minute in the bath consisting of 3 g./l. Scourol 450 (trade name of a nonionic detergent) and 1 g./l. soda ash.

| Sample No. | Results | | | |
|---|---|---|---|---|
| | Crease resistance [2] (W+F) (deg.) | Softness (mm.) by Clark softness tester | Yellowing index [1] | |
| | | | 180° C. | 200° C. |
| 10 | 321 | 56 | 1.9 | 6.6 |
| 11 | 326 | 51 | 3.1 | 6.9 |
| 12 | 325 | 50 | 3.1 | 7.0 |
| 13 | 326 | 54 | 4.2 | 7.7 |

[1] Yellowing index = $70(1-\frac{R_1}{R_2})$. A scorch tester was used and the reflectivity of the test cloth after the treatment by the scorch tester was determined: $R_1$ is the reflectivity at 455 mμ and $R_2$ is the reflectivity at 557 mμ.
[2] The crease resistance is determined by the Monsanto method.

(b) POST-CURING METHOD

[Composition of the resin bath (parts by weight)]

| Components | Sample Number | | | |
|---|---|---|---|---|
| | 20 | 21 | 22 | 23 |
| Permafresh DC [1] | 12.5 | 12.5 | 12.5 | 12.5 |
| Permafresh SF [2] | 2 | 2 | 2 | 2 |
| Catalyst F [3] | 2.5 | 2.5 | 2.5 | 2.5 |
| Composition C [4] | | 3 | | |
| Composition D [4] | | | 3 | |
| Commercial polyethylene system softener | | | | 3 |

[1] Trade name of a glyoxal-type resin for textile finishing.
[2] Trade name of a triazine high condensate-type resin for textile finishing.
[3] Trade name of zinc nitrate catalyst.
[4] The same as used in Example 3.

NOTE.—Treating conditions: Test cloth—printing cloth of No. 40 cotton; operation—immersing twice in the resin bath, squeezing twice (78%), pre-heating at 90° C. for 5 minutes and curing at 160° C. for 4 minutes.

| Sample Number | Results | | |
|---|---|---|---|
| | Crease resistance [1] (W+F) (deg.) | Softness (mm.) | Tear strength (g.) |
| 20 | 288 | 60 | 510 |
| 21 | 292 | 48 | 729 |
| 22 | 291 | 47 | 730 |
| 23 | 293 | 52 | 732 |

[1] The crease resistance is determined by the Monsanto method (JIS L-1041).

EXAMPLE 4

Embodiments of the soil-release type permanent-press finishing by using the softening agent compositions of the present invention are shown in this example.

[Composition of the resin bath (parts by weight)]

| Components | Sample Number | | | | |
|---|---|---|---|---|---|
| | 30 | 31 | 32 | 33 | 34 |
| Sumitex Resin NS-2 | 15 | 15 | 15 | 15 | 14 |
| Sumitex Accelerator MX | 4.5 | 4.5 | 4.5 | 4.5 | 4.5 |
| Sumitex Resin SR-1 [1] | | 5 | 5 | 5 | 5 |
| Composition C [2] | | | 3 | | |
| Composition D [2] | | | | 3 | |
| Commercial polyethylene-type softner | | | | | 3 |

[1] Vinyl resin-type finishing agent for soiling release finishing of textiles (Sumitomo Chemical Co., Ltd.).
[2] The same as used in Example 2.

NOTE.—Treating conditions: Test cloth—Polyester/cotton blended No. 40 broad cloth; Operation—Immersing twice in the resin bath, squeezing twice (80%), pre-heating at 80° C for 30 minutes, curing at 150° C. for 3 minutes, soaping at 40° C. with a bath consisting of 0.3% Scourol 450 (trade name of a nonionic detergent) and 0.1% soda ash.

| Sample Number | Results | | | | |
|---|---|---|---|---|---|
| | Softness (mm.) (Clark softness tester) | Tear strength (W+F) (g.) | Soil release properties | | Hygroscopicity (sec.) |
| | | | Soil redeposition ratio (percent) | Heavy oil soil release | |
| 30 | 55 | 1,390 | 18.3 | 1-2 | 17 |
| 31 | 60 | 1,310 | 11.5 | 2-3 | 4 |
| 32 | 53 | 1,650 | 9.7 | 3 | 5 |
| 33 | 53 | 1,660 | 9.5 | 3 | 5 |
| 34 | 55 | 1,660 | 23.5 | 1 | <100 |

With respect to the soil redeposition ratio, a smaller value represents a lower soiling property. In determining the heavy oil soil release, the treated cloth was soiled with a heavy oil as described in Example 1, washed under predetermined condition. The cloth completely free from the soil after the washing was given the 5 mark, whereas the cloth from which the soil was hardly removed was evaluated as 1, according to a visual observation.

The hygroscopicity was represented by the time till a drop of water which had been fallen on the treated cloth disappeared.

We claim:

1. A softening agent composition for textiles comprising (1) an epichlorohydrin adduct of sorbitan higher fatty acid ester selected from the group consisting of sorbitan higher fatty acid monoesters, diesters and mixtures thereof, wherein said higher fatty acid is selected from the group consisting of saturated and unsaturated monohydric fatty acid of $C_8$ to $C_{22}$ which are linear or branched at the $\gamma$-position of the carbon chain and mixtures thereof, and (2) an ethylene oxide adduct of 12-oxy stearic glyceride selected from the group consisting of mono-, di- and triglycerides of 12-oxy stearic acid, wherein the weight ratio of (1) to (2) ranges from 20:80 to 80:20.

2. The softening agent composition as defined in claim 1, wherein the mol number of the added epichlorohydrin unit is 0.3 to 3.0 mols per one free hydroxyl group of the ester.

3. The softening agent composition as defined in claim 3, wherein the mol number of the added ethylene oxide is 10 to 50 mols per 1 molecule of the glyceride.

* * * * *

UNITED STATES PATENT OFFICE
CERTIFICATE OF CORRECTION

Patent No. 3,666,661  Dated May 30, 1972

Inventor(s) Sumio Arai, Masaru Inouye, Yuzuru Ogata, Yukihisa Niimi, Uitiro Nishimoto It is certified that error appears in the above-identified patent and that said Letters Patent are hereby corrected as shown below:

Please change the inventor's name from "Yuzuro Ogata" to ---Yuzuru Ogata---.

Column 7, line 8; change "$\gamma$-position" to ---$\alpha$-position---.

Column 8, line 6; change "as defined in claim 3" to ---as defined in claim 2---.

Signed and sealed this 10th day of October 1972.

(SEAL)
Attest:

EDWARD M. FLETCHER, JR.
Attesting Officer

ROBERT GOTTSCHALK
Commissioner of Patents